US006466611B1

United States Patent
Bachu et al.

(10) Patent No.: US 6,466,611 B1
(45) Date of Patent: Oct. 15, 2002

(54) MULTI-USER DETECTION USING A FINITE-IMPULSE-RESPONSE MATRIX FILTER

(75) Inventors: Raja S. Bachu, Haltom City; James W. McCoy, Trophy Club, both of TX (US)

(73) Assignee: Motorola, Inc., Schaumburg, IL (US)

( * ) Notice: Subject to any disclaimer, the term of this patent is extended or adjusted under 35 U.S.C. 154(b) by 52 days.

(21) Appl. No.: 09/778,556

(22) Filed: Feb. 7, 2001

(51) Int. Cl.$^7$ .......................... H04B 15/00; H04K 1/00; H04L 27/30
(52) U.S. Cl. .................. 375/144; 375/134; 375/136; 370/320; 370/335
(58) Field of Search .................. 375/144, 134, 375/136, 147, 148, 346; 370/320, 335, 342, 441

(56) References Cited

U.S. PATENT DOCUMENTS

| | | | |
|---|---|---|---|
| 5,761,237 A | | 6/1998 | Petersen et al. ............. 375/200 |
| 5,790,537 A | * | 8/1998 | Yoon et al. ................. 370/342 |
| 5,872,776 A | * | 2/1999 | Yang ......................... 370/342 |
| 5,905,721 A | | 5/1999 | Liu et al. .................... 370/342 |
| 6,088,383 A | * | 7/2000 | Suzuki et al. ............... 375/148 |

FOREIGN PATENT DOCUMENTS

| | | | | |
|---|---|---|---|---|
| EP | 1 065 799 A1 | * | 1/2001 | ........... H04B/1/707 |
| EP | 1 128 564 A1 | * | 8/2001 | ........... H04B/1/707 |

OTHER PUBLICATIONS

Peter Hsin–Yu Wu et al., Multiuser detector with disjoint Kalman Channel Estimator for synchronous CDMA mobile radio channel' IEEE Transactions on Communications, vol. 48, No. 5, May 2000.*

Klein et al., "Zero–Forcing and Minimum Mean–Square–Error Equalization for Multiuser Detection in Code–Division Multiple–Access Channels", IEEE Transactions on Vehicular Technology, vol. 45, No. 2, pp. 276–287, May 1996.

* cited by examiner

Primary Examiner—Mohammad H. Ghayour
(74) Attorney, Agent, or Firm—Brian M. Mancini

(57) ABSTRACT

A method for multi-user detection in a CDMA communication system using a finite-impulse-response matrix filter includes a first step of inputting a received sequence of multi-user data from a channel of the communication system. A next step includes truncating a block convolution matrix representing an infinite-impulse-response matrix filter so as to provide a finite-impulse-response matrix filter equalizer by using a system matrix with smaller number of columns than the frame length. A next step includes operating on the received sequence of multi-user data with the finite-impulse-response filter so as to provide an estimate of user data for any particular user.

13 Claims, 3 Drawing Sheets

MULTI-USER DETECTION USING A FINITE-IMPULSE-RESPONSE MATRIX FILTER

FIELD OF THE INVENTION

This invention relates generally to communication systems, and more particularly to a detector for use in a receiver of multi-user communication system.

BACKGROUND OF THE INVENTION

Wireless communication systems have an ever-increasing use in transferring voice and data services. Such communication systems include the Code Division Multiple Access (CDMA) standard IS-95. The CDMA system is unique in that signals from several users overlap one another in one channel simultaneously. As a result, a receiver must process the combined signal from the one channel and extract the information sent to the user of interest. This process is known as multi-user detection or joint detection. Optimal multi-user detection schemes exist, but are computationally intensive.

Various sub-optimal receiver techniques have arisen to reduce the calculations necessary to extract the original user's signal while addressing the interference issue so as to limit error. These detection techniques include, among others, zero-forcing linear equalization, decision feedback equalization, and minimum mean-square-error equalization, used alone or in various combinations. Of these it has been reported by Klein et al. that minimum mean-square-error equalization provides the best performance in the paper "Zero-Forcing and Minimum Mean-Square-Error Equalization for Multiuser Detection in Code-Division Multiple-Access Channels", IEEE Transactions on Vehicular Technology, Vol. 45, No. 2, pp. 276–287, May 1996, hereinafter referred to as MMSE-BLE (Minimum Mean Squares Error Block Linear Equalizer) useful in a CDMA system where the scrambling code is symbol-periodic.

The MMSE-BLE technique still requires extensive manipulation and calculation relating to the full system matrix defining the CDMA block transmission system channel, such as for the downlink of the proposed CDMA Third Generation Time Division Duplex (3G TDD) standard.

There is a need for improved multi-user detection in a CDMA communication system that further reduces computational complexity without sacrificing performance. It would also be of benefit to use existing hardware and to reduce processor resources.

DETAILED DESCRIPTION OF THE PREFERRED EMBODIMENT

The present invention provides multi-user detection in a CDMA communication system using a finite-impulse-response matrix filter equalization that reduces computational complexity without sacrificing performance. No additional hardware is required and processor resources are freed up. A matrix filter estimator can be used to further reduce computations. Advantageously, by limiting the number of calculations to be performed in order to detect a user signal reliably, the present invention conserves power in the receiving communication device and saves calculation complexity.

Figure 1:
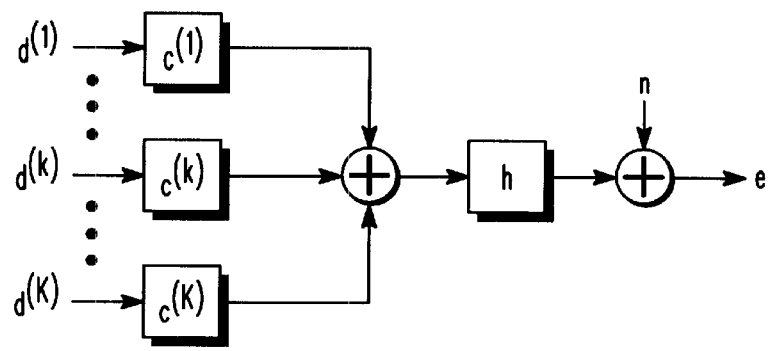
FIG. 1 shows a simplified block diagram 3G TDD downlink channel.

In a CDMA block transmission system, such as the 3G TDD downlink channel shown in FIG. 1, several users have concurrent access to the same channel within the same time window. The vector $d^{(k)}$ represents a N (bits/frame) data point sequence transmitted on $k^{th}$ code in the channel during one TDD frame duration of length W. The vector $c^{(k)}$ represents the $k^{th}$ signature sequence comprising the spreading and scrambling codes of length Q (chips in one period of a code) for each corresponding active code. In the 3G-CDMA TDD system sixteen chips are used per code. K signifies the number of active codes being used on the channel. For purposes of this invention each active code corresponds to data being input for one user, in that, typically, one user has one active code assigned. However, a user can have more than one code active such as in a multimedia application. In the description below quantities $(.)^T (.)^H$, $(.)^{-1}$ represent the transposition, conjugate transposition, and inversion of matrices, respectively.

The data stream $d^{(k)}$ on the $k^{th}$ signature sequence $c^{(k)}$ are given by $$d^{(k)}=(d_1^{(k)}, d_2^{(k)}, \ldots, d_N^{(k)})^T \text{ for } k=1,2,\ldots,K$$

respectively, where each data symbol $d_n$ of each active code is repeated Q times resulting in a Q-dimensional matrix multiplied element by element by the signature sequence $$c^{(k)}=(c_1^{(k)}, c_2^{(k)}, \ldots, c_Q^{(k)})^T \text{ for } k=1,2,\ldots,K$$

The channel impulse response (CIR) for the downlink channel is given by $$h=(h_1, h_2, \ldots, h_W)^T$$

having W samples at the chip interval. The combined CIR, $b^{(k)}$ is the convolution of the signature sequence with the CIR $$b^{(k)}=c^{(k)} \otimes h=(b_1^{(k)},b_2^{(k)}, \ldots, b_{Q+W-1}^{(k)})^T \text{ for } k=1,2,\ldots,K,$$

and the combined data vector of length K·N is the concatenation of all K data vectors in the following manner $$d=(d_1^{(1)}, d_1^{(2)}, \ldots, d_1^{(K)}, \ldots, d_k^{(1)},d_k^{(2)}, \ldots, d_k^{(K)}, \ldots, d_N^{(1)}, d_N^{(2)}, \ldots, d_N^{(K)})^T$$

which is basically the multiplexing of data from the different data streams. Noise is assumed to be Additive White Gaussian Noise (AWGN) with variance $\sigma^2$, an is defined as the zero-mean noise vector $$n=(n_1,n_2,\ldots, n_{N \cdot Q+W-1})^T$$

is subsequently added to the combined data vector resulting in a received signal vector $$e=(e_1,e_2,\ldots, e_{N \cdot Q+W-1})^T=Ad+n$$

where A is the (N·Q+W−1)×(K·N) system matrix given by $$A_{Q \cdot (n-1)+l, k+K \cdot (n-1)} = \begin{cases} b_l^{(k)} & \text{for } k=1 \ldots K, n=1 \ldots N, l=1 \ldots Q+W-1 \\ 0 & \text{otherwise} \end{cases}$$

For example, where K=2, N=3, Q=3 and W=4 the system matrix A has the structure shown below.

$$A = \begin{bmatrix} b_1^{(1)} & b_1^{(2)} & 0 & 0 & 0 & 0 \\ b_2^{(1)} & b_2^{(2)} & 0 & 0 & 0 & 0 \\ b_3^{(1)} & b_3^{(2)} & 0 & 0 & 0 & 0 \\ b_4^{(1)} & b_4^{(2)} & b_1^{(1)} & b_1^{(2)} & 0 & 0 \\ b_5^{(1)} & b_5^{(2)} & b_2^{(1)} & b_2^{(2)} & 0 & 0 \\ b_6^{(1)} & b_6^{(2)} & b_3^{(1)} & b_3^{(2)} & 0 & 0 \\ 0 & 0 & b_4^{(1)} & b_4^{(2)} & b_1^{(1)} & b_1^{(2)} \\ 0 & 0 & b_5^{(1)} & b_5^{(2)} & b_2^{(1)} & b_2^{(2)} \\ 0 & 0 & b_6^{(1)} & b_6^{(2)} & b_3^{(1)} & b_3^{(2)} \\ 0 & 0 & 0 & 0 & b_4^{(1)} & b_4^{(2)} \\ 0 & 0 & 0 & 0 & b_5^{(1)} & b_5^{(2)} \\ 0 & 0 & 0 & 0 & b_6^{(1)} & b_6^{(2)} \end{bmatrix}_{12(N+Q+W-1) \times 6(KN)}$$

The received sequence e is processed in a receiver to detect and obtain decisions on the transmitted data vectors $d^{(k)}$ wherein the user signature sequences $c^{(k)}$ is known by the receiver, and the CIR, described by system matrix A, is known or calculated using techniques known in the art.

In the prior art MMSE-BLE technique, the solution for the transmitted user data sequences is estimated by $$d^{est} = (A^H A + \sigma^2 I)^{-1} A^H e$$

as described in Klein et al., "Zero-Forcing and Minimum Mean-Square-Error Equalization for Multiuser Detection in Code-Division Multiple-Access Channels", IEEE Transactions on Vehicular Technology, Vol. 45, No. 2, pp. 276–287, May 1996.

A straightforward solution to this equation is to force through all the equations, which includes taking the inverse operator of a matrix, and multiply those rows of this operator, which correspond to the codes assigned to a user of interest, with the vector $A^H e$. However effective, this will be computationally complex because it involves the inversion of a large matrix.

The MMSE-BLE technique solves the above equation by using Cholesky decomposition on the infinite-impulse-response matrix filter $(A^H A + \sigma^2 I)$. Cholesky decomposition is achieved by first defining $$z = A^H e$$

Substituting this in the MMSE-BLE solution results in $$d^{est} = (A^H A + \sigma^2 I)^{-1} z$$

The Cholesky decomposition step is represented as shown below $$A^H A + \sigma^2 I = LL^H$$

Substituting this in the MMSE-BLE solution results in $$LL^H d^{est} = z$$

Defining $$L^H d^{est} = w$$

and substituting this in the above equation results in $$Lw = z$$

avoiding the calculation of an inversion of a large matrix. Some of the terms used in the above equation are elaborated below.

$$d^{est} = \begin{bmatrix} d_1^{est} \\ d_2^{est} \\ \ldots \\ d_N^{est} \end{bmatrix} \quad w = \begin{bmatrix} w_1 \\ w_2 \\ \ldots \\ w_N \end{bmatrix} \quad d_k^{est} = \begin{bmatrix} d_k^{(1)est} \\ d_k^{(2)est} \\ \ldots \\ d_k^{(K)est} \end{bmatrix} \quad w_k = \begin{bmatrix} w_k^{(1)} \\ w_k^{(2)} \\ \ldots \\ w_k^{(3)} \end{bmatrix}$$

where $d_k^{(i)est}$ is the estimate of the $k^{th}$ symbol of the $i^{th}$ user.

In the MMSE-BLE technique, to obtain $d_n^{(j)est}$ for all $1 \leq k \leq N$, i.e. all the symbols of user j, it is first necessary to solve for w. In particular, all of w must be solved for since an infinite-impulse-response (IIR) filter is used which does not only include those components of w that are relevant to user j. Therefore, all of the components are needed for solving $d^{est}$. This is backward substitution. To determine $d^{est}$ it is again necessary to solve for all the components of $d^{est}$ for the same reasons. This is forward substitution. Both forward and backward substitution are similar to IIR Matrix filtering operations as are known in the art and involve feedback of vectors which need to be calculated wholly and not partially, and hence the prior art MMSE-BLE technique does not solve for particular components of w and $d^{est}$.

In the present invention the system matrix A can be written in the form $$A = \begin{bmatrix} A_0 & 0 & 0 \\ A_1 & A_0 & 0 \\ 0 & A_1 & A_0 \\ 0 & 0 & A_1 \end{bmatrix}$$

where $A_0$ and $A_1$ are blocks of size Q×K, and the matrix is a block convolution matrix.

In the general case, the system matrix A will have ρ+1 blocks, where ρ is defined as $$\rho = \left\lceil \frac{W-1}{Q} \right\rceil.$$

This is because the length of the sequences $b^{(k)}$ is Q+W−1. If this is split into blocks of size Q, there will be ρ+1 blocks after appending the requisite number of zeros to make Q+W−1 evenly divisible by Q.

Figure 2:
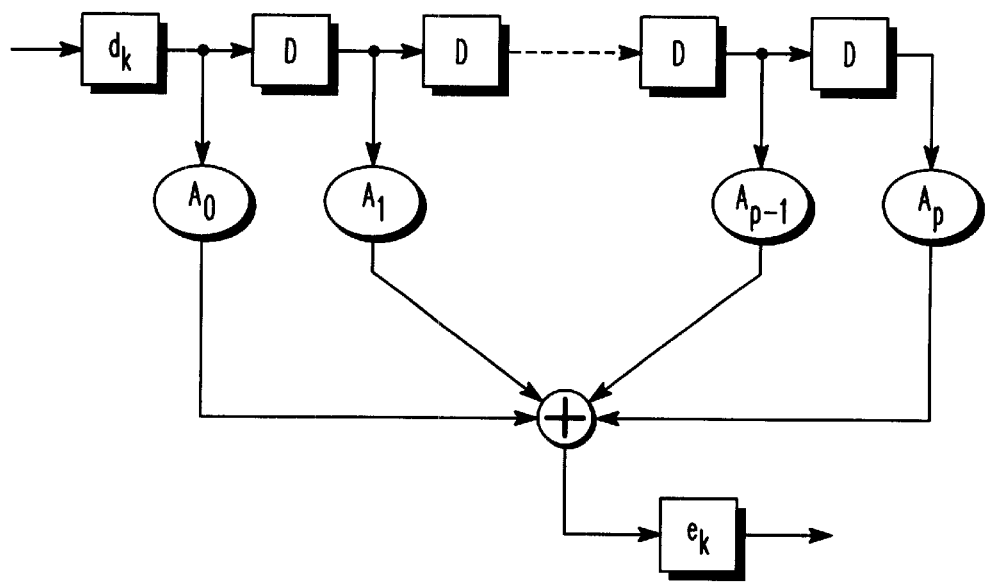
FIG. 2 shows a simplified block diagram of an equivalent block matrix filter representation of the 3G TDD downlink channel.

Referring to FIG. 2, pre-multiplication by matrix A can be treated as convolution of a matrix filter (A filter whose taps between delay blocks D are matrices) of size ρ+1 and the $b^{(k)}$ sequence of vectors of size K×1. Also in the above equation e and n are the

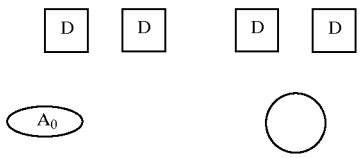

output and the noise vectors respectively and are both of size $(N+\rho)Q$. Following the filtering interpretation, we can think of e as a sequence of $(N+\rho)$ vectors of size $Q\times1$. Thus we can describe the downlink of the TDD CDMA system in the form of a matrix filter. The filtering operation is shown below.

In contrast to the previously described MMBE-BLE technique, the present invention only calculates using those components that are relevant to a user. This solution is similar to the formation of an FIR filter from the IIR filter $(A^H A + \sigma^2 I)^{-1}$ with the impulse response being truncated to the length of the observation vector. The IIR filter can be truncated to a few taps while forming the FIR filter with minimal loss in performance. In other words, the previously described IIR Matrix operation is converted to an FIR Matrix operation. This is advantageous because FIR Matrix filtering does not involve feedback and hence only the Q codes assigned to a user of interest need to be demodulated, resulting in a reduction of the computational complexity. Also, it is advantageous to truncate the IIR filter in order to avoid computing all the coefficients most of which will be insignificant and hence truncation will result in minimal performance loss.

Figure 3:
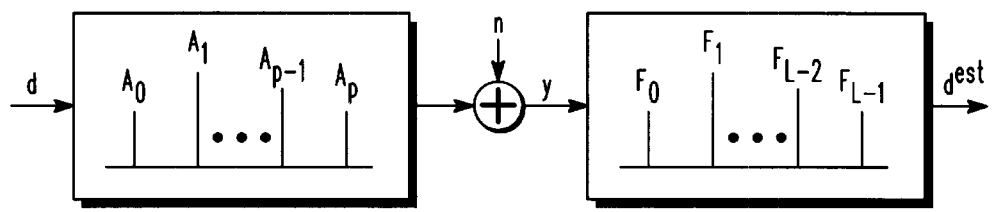
FIG. 3 shows a simplified block diagram of finite-impulse-response matrix filtering of an input sequence to obtain an estimated data sequence, in accordance with the present invention.

The system can be modeled as shown in the FIG. 3 where FIR matrix filter coefficients F are determined such that the error variance is minimized. A novel aspect of the present invention is, instead of trying to equalize the whole block of length N as in the case of the prior art MMSE-BLE technique, a smaller block of length L is equalized. Typically, L is on the order of $\rho+1$. The system equation then would be $$e = Cd + n$$

Here, the matrix C is defined as shown below and has L columns.

$$C = \begin{bmatrix} A_0 & 0 & \cdots & 0 & 0 \\ A_1 & A_0 & \cdots & 0 & 0 \\ & & \cdots & & \\ 0 & 0 & \cdots & A_\rho & A_{\rho-1} \\ 0 & 0 & \cdots & 0 & A_\rho \end{bmatrix}$$

In this case, the block length has been reduced from N to L. The vector d can be any block of L vectors of size $K\times1$ from the N available vectors from the frame, and $e$ is the corresponding output. This equation is not exact because it assumes that the data points before and after the data block under consideration are zeros and some of the top and bottom equations resulting out of the matrix equation are not exact. The solution to this equation is now $$d^{est} = (C^H C + \sigma^2 I)^{-1} C^H e$$

wherein the matrix $(C^H C + \sigma^2 I)^{-1} C^H$ is a block convolution matrix because it is the product of two block convolution matrices.

A novel aspect of the present invention is to take a row or column of the combined block convolution matrix to obtain a finite-impulse response (FIR) matrix filter equalizer for equalizing a block smaller or equal to a frame length of input data. In particular, the FIR filter equalizer is obtained by taking either one of the middle rows or one of the middle columns of the combined block convolution matrix since edge rows and columns do not have all the filter coefficients and hence they are not taken. A parameter, $\delta$, is defined to decide which column (or row) is to be chosen to serve as an FIR matrix filter equalizer. If we define $$h_\delta = [0 \ldots I^{Q\times Q} \ldots 0]^H$$

where the identity matrix in $h_\delta$ is in the $\delta^{th}$ row, the required filter can be written as $$f^{opt} = (C^H C + \sigma^2 I)^{-1} C^H h_\delta$$

Figure 4:
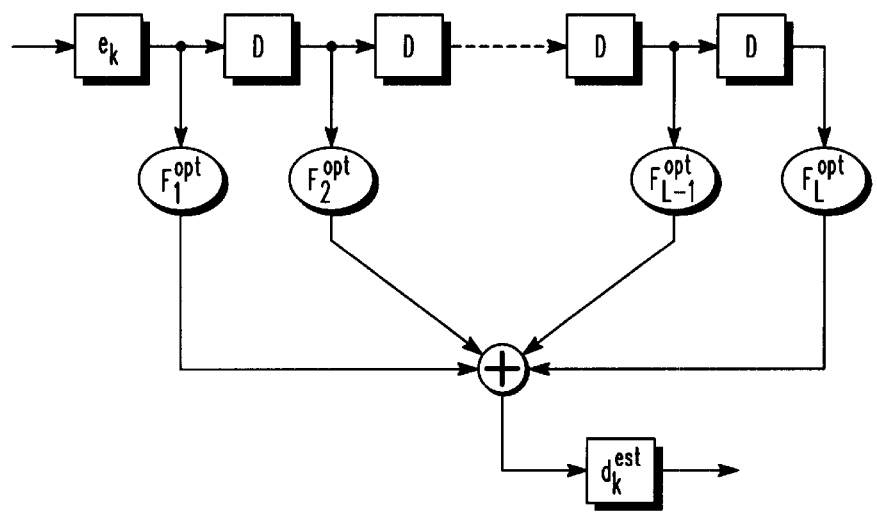
FIG. 4 shows a block diagram of the finite-impulse-response matrix equalizer, in accordance with the present invention.

The equalization procedure is shown in the FIG. 4 representing a block diagram of the FIR matrix equalizer of the present invention. The matrix blocks $f^{opt}$ are the equalizer taps of size $K\times Q$ which operate on (are convolved with) sequence e through delay blocks D to obtain the estimated data sequence $d^{est}$.

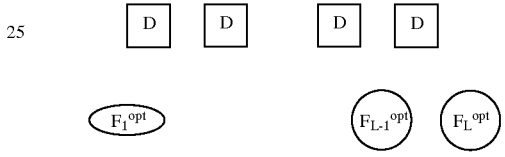

In a preferred embodiment, and in order to gain computational efficiency, the FIR filter equalizer can be split into two FIR matrix filters $$f_1 = C^H h_{\delta 1}$$

and $$f_2 = (C^H C + \sigma^2 I)^{-1} h_{\delta 2}$$

where $$h_{\delta 1} = [0 \ldots I_{Q\times} \ldots 0]^H$$

and $$h_{\delta 2} = [0 \ldots I_{K\times K} \ldots 0]^H$$

In this case, convolving the two filters $f_1$ and $f_2$, has the same result as taking a row or column of the combined convolution matrix as described above, but uses less computations. In particular, at least one of the filters includes multiplying a conjugate transposition of an identity matrix, in the row of the matrix filter taps which correspond to the codes assigned to a particular user of interest, with the conjugate transposition of the matrix C. For example, while performing the second filtering operation a particular user can demodulate their own data without demodulating the data of the other users. Specifically, when performing the second filtering, a matrix X of size $K\times K$ is multiplied with a vector y of size $K\times1$ to get a vector d of size $K\times1$, i.e. $d = Xy$. However, if only the $k^{th}$ element in K is required, all that is needed is to multiply the $k^{th}$ row of X with y. Hence the computational savings. This can be done by convolving only those rows of the matrix filter taps, which correspond to the codes assigned to that particular user (using knowledge of the active codes), with the input vector sequence e. Basically, $d^{est}$ is obtained by first convolving e with $f_1$. Let us call the result of this x. Then to complete the process, x is convolved with $f_2$. It is while convolving with $f_2$ that the computational gain is obtained, as has been explained above.

In summary, the present invention provides a method for multi-user detection in a CDMA communication system using a finite-impulse-response matrix filter. The method includes a first step of inputting a received sequence of multi-user data from a channel of the communication system, wherein active codes identify each particular user of the channel. A next step includes truncating a block convolution matrix representing an infinite-impulse-response filter defining a system equation of the channel so as to provide a finite-impulse-response filter. A next step includes operating on the received sequence of multi-user data with the finite-impulse-response filter so as to provide an estimate of user data for any particular user.

Preferably, the truncating step includes a step of taking one of a middle column and a middle row of the infinite-impulse response (IIR) filter to define a finite-impulse response equalizer, and the operating step includes operating on the received sequence of multi-user data with the finite-impulse-response filter with a smaller block length than the IIR filter. Particularly, this step includes using a system matrix with smaller number of columns than the frame length of input code by taking a smaller size system matrix with L columns of blocks of size Q×K.

More preferably, the taking step includes splitting the FIR matrix filter equalizer into two FIR matrix filters in order to reduce the computational complexity. The reduction is achieved during the second FIR matrix filtering by convolving the output vector sequence of the first FIR matrix filtering operation with only those rows of the second FIR matrix filter that will result in the estimating the data of the user of interest. The operating step includes operating on the received sequence of multi-user data with the first filter, which includes a conjugate transposition of the smaller sized system matrix C multiplied by a conjugate transposition of an identity matrix located in a row of a user of interest and then operating on the result by convolving only those rows of the second filter which correspond to the active codes of the user of interest, which results in the estimation of data of the user of interest. The rows used are determined through the knowledge of which codes have been assigned to the user among the active codes.

Advantageously, the present invention provides an improvement in terms of computational complexity when the ratio of the number of codes assigned to a user of interest and the total number of active codes is small. Overall, the present invention is an improvement over the prior art due to the lesser number of matrix coefficients that have to be computed. In particular, because the matrix that is inverted is of smaller dimensions than in the prior art, the present invention is better suited for fixed-point implementation. This is because matrix inversion in these cases using Cholesky decomposition is essentially a feedback operation, which has an inherent problem of error propagation. Therefore, inversion of a smaller matrix has less error propagation.

EXAMPLE

A data sequence undergoes several processing steps in the prior art and as described above for the present invention. These include one or more of matched filtering, calculation of $A^H A$, fast Cholesky decomposition, forward/backward recursions, and FIR matrix filtering. The number of calculations for each operation is represented below. The complexity of calculating all of the matrix operation described above can be estimated. The operations involved comprise one or more of multiply and accumulated (MAC) operations, square root operations, and division operations. The matched filtering operation consists of MAC operations totaling $2NK(Q+W-1)$. The calculation of $A^H A$ requires MAC operations totaling $0.5K(K+1)(Q+W-1)+\rho K^2(W-0.5Q(\rho-1)-1)$. Fast Cholesky decomposition requires MAC operations totaling $(2\rho+2/3)K^3+\rho K^2-2K/3$, square root operations totaling $2K$, and division operations totaling $NK((\rho+0.5)K-1)$. The forward and backward recursions require MAC operations totaling $(LK-1)K((2\rho+1)K-2)$ and division operations totaling $LK^2$. Lastly, FIR matrix filtering requires MAC operation totaling $2NLKK'$, where $K'$ is the number of codes assigned to a user of interest.

Table 1 shows the total number of operations necessary to perform the present invention FIR matrix filter equalization in comparison to the prior art MMSE-BLE method. Assuming $\rho=1$ and $L=2\rho+1$, several user scenarios are presented.

TABLE 1

| MOPS (millions of operations per second) | | |
|---|---|---|
| | MMSE-BLE | FIR matrix filter |
| 12.2 kbps 4 users | 82915500 | 64453500 |
| 12.2 kbps 2 users | 31117500 | 28219500 |
| 64 kbps 2 users | 117052500 | 104146500 |
| 144 kbps 1 user | 99277500 | 110139000 |
| 384 kbps 1 user | 82915500 | 90805500 |

It can be observed from Table 1 that when the ratio of the number of codes assigned to a user of interest to the total number of active codes is small, the present invention provides a reduction in computational complexity.

A numerical simulation was performed using the finite-impulse-response matrix filter equalization, in accordance with the present invention. The results are provided below. Channel—ITU Pedestrian B simulation data, as is known in the industry, was used in the numerical simulation for all simulations.

Figure 5:
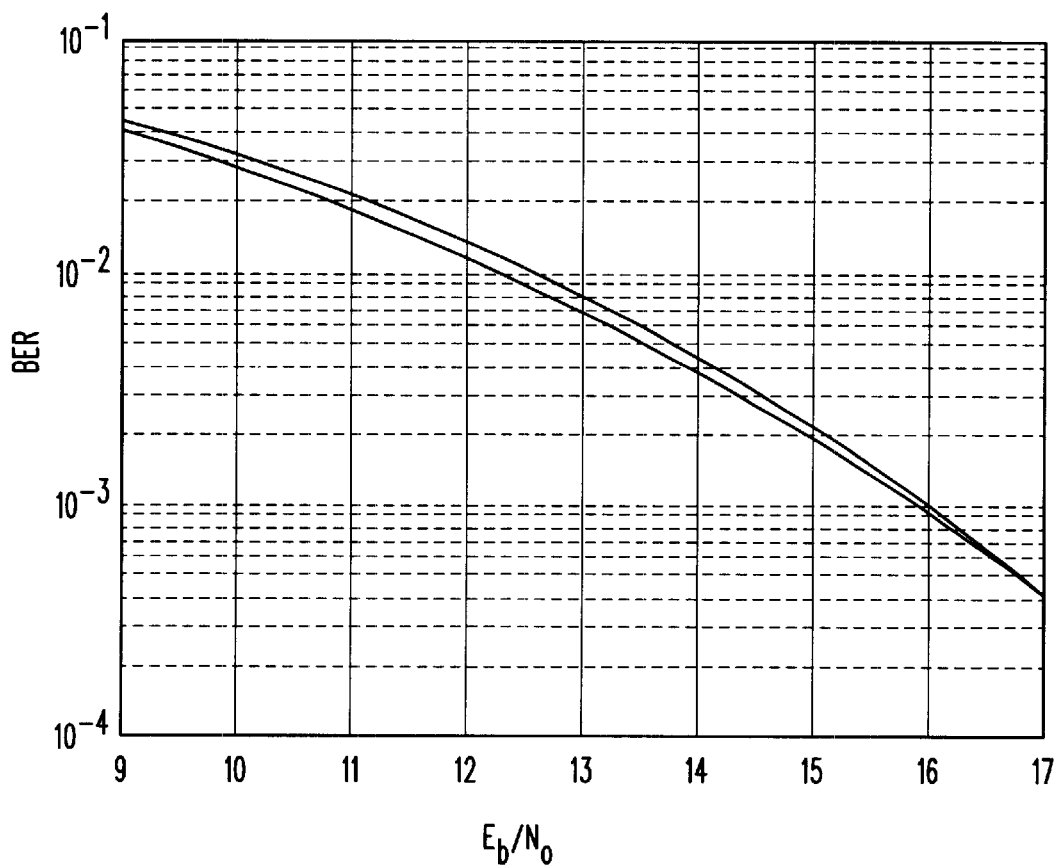
FIG. 5 shows a graphical representation the performance improvement provided by the present invention.

FIG. 5 shows a graph of the results indicating bit-error-rate (BER) versus $E_b/N_o$ (energy per bit/noise power density) in an operating environment of five active codes (out of sixteen possible), for the prior art MMSE-BLE model and the FIR equalizer (L=5, δ=2) of the present invention. As can be seen, the present invention provides improved bit error rate (shown as the lower curve) at lower $E_b/N_o$ over the prior art method (shown as the upper curve). In addition, this is accomplished with fewer calculations as described previously. Increasing FIR matrix size (e.g. L>5) results in better performance at the expense of more calculations. However, in an environment with a higher number of active codes, the performance of the present invention start to fall off, which must be balanced against the processing savings made available by the reduction in processing requirements.

In review, the present invention provides multi-user detection in a CDMA communication system using a finite-impulse-response matrix filter equalization that reduces computational complexity without sacrificing performance. No additional hardware is required and processor resources are freed up.

While specific components and functions of the present invention are described above, fewer or additional functions could be employed by one skilled in the art and be within the broad scope of the present invention. The invention should be limited only by the appended claims.

What is claimed is:

1. A method for multi-user detection in a CDMA communication system using a finite-impulse-response matrix filter, the method comprising the steps of:
   inputting a received sequence of multi-user data from a channel of the communication system, active codes identifying particular users of the channel;
   truncating a block convolution matrix representing an infinite-impulse-response filter defining a system equation of the channel so as to provide a finite-impulse-response filter; and
   operating on the received sequence of multi-user data with the finite-impulse-response filter so as to provide an estimate of user data for any particular user.

2. The method of claim 1, wherein the truncating step includes a step of taking one of a middle column and a middle row of the infinite-impulse response filter to define a finite-impulse response (FIR) matrix filter equalizer, and the operating step includes operating on the received sequence of multi-user data with the finite-impulse-response filter.

3. The method of claim 2, wherein the taking step includes splitting the FIR matrix filter equalizer into two FIR matrix filters, at least one of the filters includes convolving only those rows of the matrix filter taps, which correspond to the codes assigned to a particular user of interest, and wherein the operating step includes operating on the received sequence of multi-user data with the first filter and then operating on the result with the second filter.

4. The method of claim 1, wherein the truncation step includes taking a smaller size system matrix with a smaller number of columns than a frame length of code.

5. The method of claim 4, wherein the truncating step includes defining the finite-impulse-response filter to be one of the rows or columns of the matrix $(C^H C + \sigma^2 I)^{-1} C^H$.

6. The method of claim 1, wherein the truncation step includes splitting the finite-impulse-response filter into a first filter $C^H h_{\delta 1}$ where $h_{\delta 1} = [0 \ldots I_{Q \times Q} \ldots 0]^H$ and a second filter $(C^H C + \rho^2 I)^{-1} h_{\delta 2}$ where $h_{\delta 2} = [0 \ldots I_{K \times K} \ldots 0]^H$, and wherein the operating step includes operating on the received sequence of multi-user data with the first and second filters sequentially.

7. A method for multi-user detection in a CDMA communication system using a finite-impulse-response matrix filter, the method comprising the steps of:
   inputting a received sequence of multi-user data from a channel of the communication system, active codes identifying particular users of the channel;
   truncating a block convolution matrix representing an infinite-impulse-response filter, defining a system equation of the channel so as to provide a finite-impulse-response matrix filter equalizer;
   providing two filters from the finite-impulse-response filter, at least one of the filters includes convolving only those rows of the matrix filter taps, which correspond to the codes assigned to a particular user of interest using knowledge of the active codes, with the received sequence; and operating on the received sequence of multi-user data with the first filter and then operating on the result with the second filter so as to provide an estimate of user data for any particular user.

8. The method of claim 7, wherein the truncation step includes taking a smaller size system matrix with a smaller number of columns than a frame length of code.

9. The method of claim 7, wherein the truncating step includes defining the finite-impulse-response filter to be one of the rows or columns of the matrix $(C^H C + \sigma^2 I)^{-1} C^H$.

10. The method of claim 7, wherein the truncation step includes splitting the finite-impulse-response filter into a first filter $C^H h_{\delta 1}$ where $h_{\delta 1} = [0 \ldots I_{Q \times Q} \ldots 0]^H$ and a second filter $(C^H C + \sigma^2 I)^{-1} h_{\delta 2}$ where $h_{\delta 2} = [0 \ldots I_{K \times K} \ldots 0]^H$, and wherein the operating step includes operating on the received sequence of multi-user data with the first and second filters sequentially.

11. A method for multi-user detection in a CDMA communication system using a finite-impulse-response matrix filter, the method comprising the steps of:
   inputting a received sequence of multi-user data from a channel of the communication system, active codes identifying particular users of the channel;
   truncating a block convolution matrix representing an infinite-impulse-response filter defining a system equation of the channel so as to provide a finite-impulse-response matrix filter equalizer;
   splitting the finite-impulse-response filter into a first filter $C^H h_{\delta 1}$ where $h_{\delta 1} = [0 \ldots I_{Q \times Q} \ldots 0]^H$ and a second filter $(C^H C + \sigma^2 I)^{-1} h_{\delta 2}$ where $h_{\delta 2} = [0 \ldots I_{K \times K} \ldots 0]^H$; and operating on the received sequence of multi-user data with the first filter and then operating on the result with the second filter so as to provide an estimate of user data for any particular user.

12. The method of claim 11, wherein the truncating step includes a step of taking one of a middle column and a middle row of the infinite-impulse response filter to define a finite-impulse response (FIR) matrix filter equalizer, and the operating step includes operating on the received sequence of multi-user data with the finite-impulse-response filter.

13. The method of claim 12, wherein the taking step includes splitting the FIR matrix filter equalizer into two FIR matrix filters, at least one of the filters includes convolving only those rows of the matrix filter taps, which correspond to the codes assigned to a particular user of interest using knowledge of the active codes, with the received sequence, and wherein the operating step includes operating on the received sequence of multi-user data with the first filter and then operating on the result with the second filter.

* * * * *

UNITED STATES PATENT AND TRADEMARK OFFICE
CERTIFICATE OF CORRECTION

PATENT NO.   : 6,466,611 B1
DATED        : October 15, 2002
INVENTOR(S)  : Bachu et al.

It is certified that error appears in the above-identified patent and that said Letters Patent is hereby corrected as shown below:

Column 9,
Line 40, formula reads "$(C^H C + \rho^2 I)^{-1} h_{\delta 2}$", should read -- $(C^H C + \sigma^2 I)^{-1} h_{\delta 2}$ --.

Signed and Sealed this

Eighteenth Day of March, 2003

JAMES E. ROGAN
*Director of the United States Patent and Trademark Office*